United States Patent [19]
Wilde et al.

[11] Patent Number: 5,332,337
[45] Date of Patent: Jul. 26, 1994

[54] PARTICLE FEEDING DEVICE AND METHOD FOR PYROLYTIC CARBON COATERS

[75] Inventors: David S. Wilde; Billie F. Hightower, both of Austin; James A. Accuntius, Georgetown, all of Tex.

[73] Assignee: Carbon Implants, Inc., Austin, Tex.

[21] Appl. No.: 821,472

[22] Filed: Jan. 14, 1992

[51] Int. Cl.⁵ .................................................. B65G 53/66
[52] U.S. Cl. ............................................ 406/24; 406/50; 406/146
[58] Field of Search .......................... 406/24, 146, 50

[56] References Cited

U.S. PATENT DOCUMENTS

| | | | |
|---|---|---|---|
| 531,379 | 12/1894 | Mathewson | 406/146 X |
| 636,279 | 11/1899 | Newhouse . | |
| 1,755,329 | 4/1930 | McCormack . | |
| 2,572,078 | 10/1951 | Upham | 302/53 |
| 2,919,160 | 12/1959 | Blackburn | 302/57 |
| 2,941,842 | 6/1960 | Wishaw | 302/52 |
| 3,007,744 | 11/1961 | Ward et al. | 302/53 |
| 3,074,600 | 1/1963 | Warhurst | 222/193 |
| 3,501,097 | 3/1970 | Daley | 329/85 |
| 3,638,839 | 2/1972 | Weightman | 222/193 |
| 3,913,795 | 10/1975 | Coucher et al. | 222/194 |
| 3,976,332 | 8/1976 | Fabel | 302/57 |
| 3,977,896 | 8/1976 | Bokros et al. | 427/213 |
| 4,482,275 | 11/1984 | Shinozaki et al. | 406/24 X |
| 4,594,270 | 6/1986 | Brooks | 427/213 |
| 4,883,390 | 11/1989 | Reintjes et al. | 406/24 |
| 4,904,127 | 2/1990 | Morimoto et al. | 406/24 X |

Primary Examiner—David M. Mitchell
Assistant Examiner—Gary C. Hoge
Attorney, Agent, or Firm—Fitch, Even, Tabin & Flannery

[57] ABSTRACT

A particle feeding device and method for fluidized bed coaters that has no moving parts. It preferably provides for constant flow of purge gas into the fluidized bed coater and has a feedback control means for monitoring and precisely controlling the flow of particles into the coater. The particle feeding device includes a supply of granular material in communication with a generally horizontal passageway and a delivery conduit for feeding granular material into a desired location, such as a fluidized bed coater. The amount of granular material remaining in the supply is periodically determined and pulses of gas are periodically discharged through said generally horizontal passageway so as to blow granular material into said delivery conduit in a manner so as to feed the precise amount of granular material for predetermined periods of time.

14 Claims, 4 Drawing Sheets

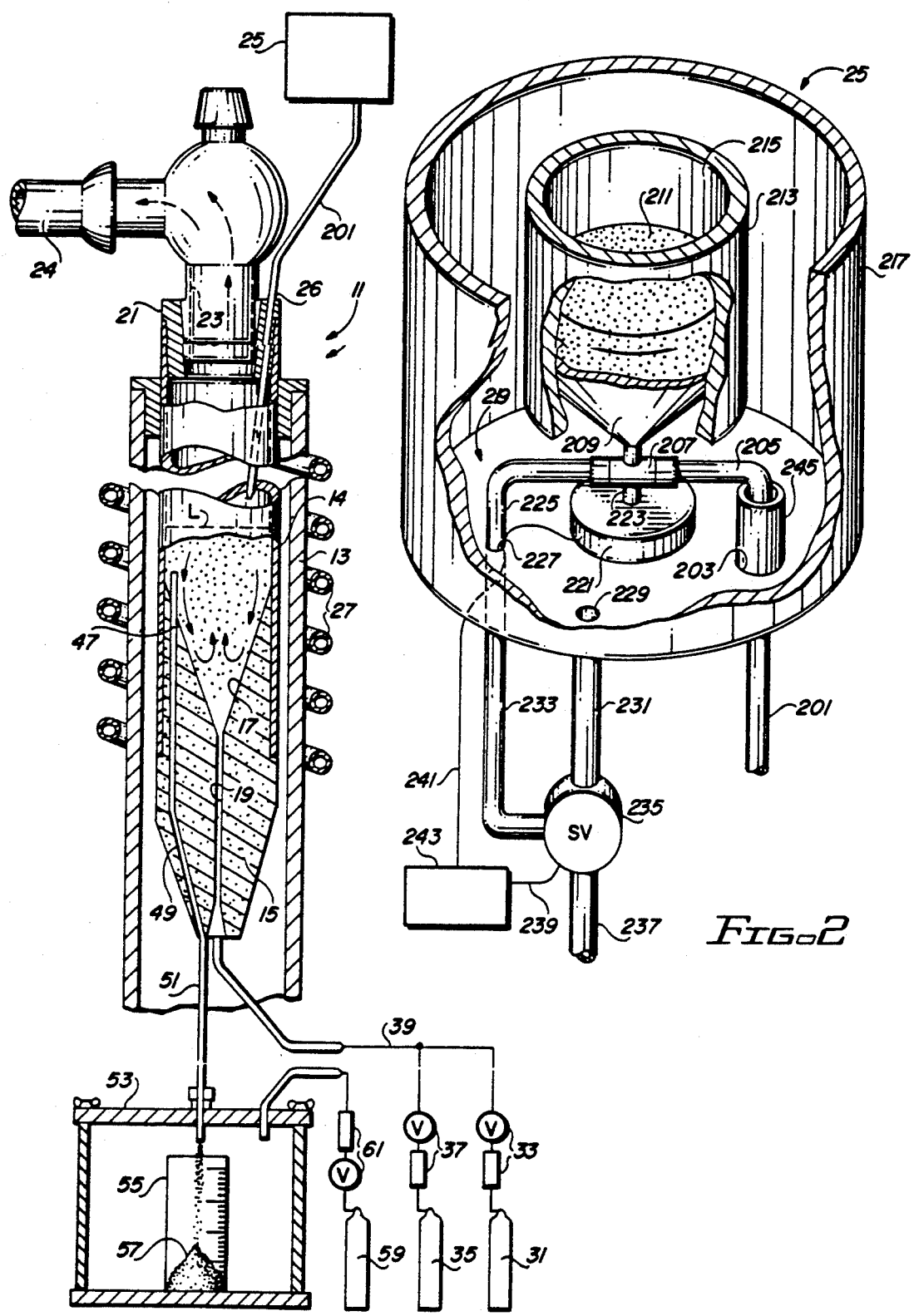

PARTICLE FEEDING DEVICE AND METHOD FOR PYROLYTIC CARBON COATERS

This invention relates to processes for depositing pyrolytic carbon having desired physical characteristics and to apparatus for facilitating such deposition processes. More specifically, this invention relates to particulate feeding devices for feeding particles into said apparatus.

BACKGROUND OF THE INVENTION

Pyrolytic carbon may be deposited by thermally decomposing gaseous hydrocarbons or other carbonaceous substances in vaporous form in the presence of a substrate whereupon the deposition will take place. It is well known to coat substrates with layers of pyrolytic carbon for various different purposes. In this respect, the coating may oftentimes completely envelop the substrate, and the composite coated substrate may be the desired end product. In other instances, a very large object or a mandrel may be coated on less than all sides with an extremely thick layer of pyrolytic carbon, and subsequently the mandrel may be machined away or otherwise removed whereby the monolithic coating becomes the desired end product. The present invention is suitable for use with all such instances, even if the underlying substrate is eventually removed.

When pyrolytic carbon is deposited in a fluidized bed apparatus, one of the variables upon which the structure of the pyrolytic carbon will be dependent is the available deposition surface area, relative to the volume of the furnace enclosure wherein the deposition is occurring. Pyrolytic carbon which has a microstructure that is free of growth features will be deposited when the relative amount of deposition surface area is fairly high. Thus, when relatively large objects, for example, objects having at least one dimension equal to 5 mm or more, are being coated, an ancillary bed of small particles (usually of a size measured in hundreds of microns) are included within the furnace enclosure together with the larger object or objects. This arrangement provides sufficient available total surface area to assure that pyrolytic carbon having the desired crystalline form will be deposited. In addition, the random motion of large objects in fluidized beds provide for a relatively uniform deposition of carbon on all surfaces.

However, whenever such submillimeter particles are being coated in a fluidized bed, the total surface area of the particles begins to increase significantly as the diameters of the pyrolytic carbon-coated particles grow. This change in the available deposition surface area in the fluidized bed will result in a change in the physical characteristics of the pyrolytic carbon being deposited if the other coating variables are held constant, e.g., coating temperature, gas flow rate and gas composition; and moreover, when the bed reaches some maximum size, it will collapse and thus limit the thickness of the carbon coating that can be deposited on levitated substrates under constant conditions. Changes in the physical characteristics of the carbon deposited may be undesirable for any of a number of reasons.

It has been found that pyrolytic carbon having good structural strength and uniform physical properties can be deposited as relatively thick coatings upon relatively large objects in the accompaniment of particles if the available fluidized bed surface area is maintained relatively constant by withdrawing particles which have become enlarged in size as a result of coating and feeding smaller size particles into the deposition enclosure. Very generally, the availability of a relatively large amount of deposition surface area in a furnace enclosure of a given volume facilitates the efficient deposition of pyrolytic carbon which is either isotropic or laminar in microstructure and without growth features. In contrast when carbon is deposited on a fixed substrate (e.g., a mandrel) in a chamber without a bed of particles, large gradients in gas composition are established at the gas-solid interfaces where the deposition is occurring, and growth features develop in the microstructure of the deposited carbon. Illustrations and theoretical considerations are reviewed in J. C. Bokros, "The Preparation, Structure, and Properties of Pyrolytic Carbon," in *Chemistry and Physics of Carbon*, Vol. 5, P. L. Walker (ed.) Marcel Dekker, New York, 1969, Chapter 1.

The crystalline structure, the density and other physical properties, such as the coefficient of thermal expansion, of pyrolytic carbon deposited by the thermal decomposition of a vaporous carbonaceous substance are dependent upon several independently variable operating conditions within the coating apparatus being employed. These conditions include the temperature of the substrate surfaces upon which the deposition is occurring, the overall chemical composition of the atmosphere from which deposition is occurring, the partial pressure of the vaporous carbonaceous substance, the surface area to volume ratio in the active deposition region of the coating apparatus, and the contact time (a parameter based upon the gas flow rate and cross sectional area of the furnace enclosure). Although various of these conditions can be easily regulated and therefore maintained at a constant desired value in many different types of coating apparatus, the surface area to volume ratio is inherently subject to constant change because there is a continuous gradual increase in the total surface area as the items being coated grow in size as the result of the deposition thereupon. When a bed of small spheroids or the like, having an average size between about 50 microns and 600 microns, is present in the active deposition surface region (either because they are the products being coated, e.g., in the case of nuclear fuel particles, or because they are associated with other objects being coated so as to increase the total surface area to void volume ratio), such small particles increase relatively rapidly in surface area as the diameters of these particles grow during deposition of pyrolytic carbon.

A desired surface area to volume ratio is initially provided by starting with an appropriate amount of particles of a particular average size to constitute the fluidized bed. Preferably, an initial surface area to volume ratio is provided near the lower end of the range that produces crystalline pyrolytic carbon having the physical properties desired. Thereafter, as the growing thickness of the deposited pyrolytic carbon layers causes the total surface area to increase, withdrawal of some of the coated particles is initiated so as to decrease the total number of particles to thereby maintain a specific surface area or to regulate its increase in a controlled manner. Thereafter, replacement of the particles being withdrawn with particles of much smaller size is begun.

In coating operations where it is desirable to employ a relatively large surface area to volume ratio, a coating apparatus is of course employed which can maintain such a bed of particles in motion and in association with any larger objects that may also be coated. Examples of suitable coating apparatus of this type include, fluidized bed coaters and rotating drum coaters. A fluidized bed coater such as that of U.S. Pat. No. 3,977,896 issued to Bokros et al. on Aug. 31, 1976 (the disclosure of which is incorporated herein by reference) is an example of one which can satisfactorily perform the pyrolytic carbon deposition process, and hereinafter reference is made to such fluidized bed coaters. See also, U.S. Pat. No., 4,594,2701 issued to Brooks on Jun. 10, 1986, incorporated herein by reference as a further example.

Heretofore mechanical feeding systems have generally been employed to move particles of small size into a fluidized bed coater after or contemporaneous with the removal of particles enlarged by the pyrolytic carbon coating process. Such mechanical feeding systems have generally used moving parts such as gears, screws, disks, shafts, belts and motors. Disadvantageously, such mechanical feeding system parts, when subjected to abrasive, reactive or hard ceramic particles, tend to wear, jam and/or contaminate the particles. Contamination of the feed particles may occur as a result of the introduction of foreign particles which become separated from machine parts as the machine parts wear against one another and against the particles. Such contamination can cause irregularities in the crystal structure of the pyrolytic carbon coating. Irregularities may occur either in the particle coatings or in the coating of a larger substrate being levitated in the fluidized coating bed. Hence, what is needed is a device for feeding particles into a pyrolytic carbon coater that contains no moving or mechanical parts to wear or contaminate the particulate material.

In addition to the above-described features, some particle feeding devices have previously employed a "lost-weight" method of determining whether appropriate amounts of particles have been dispensed into the fluidized bed coater. The "lost-weight" method comprises periodically measuring the weight of a supply of granular material over time and comparing previous measurements with subsequent measurements so as to determine the weight lost from the supply. However, devices that have previously employed the "lost-weight" method have used the "lost-weight" method to control mechanical apparatuses that utilize moving parts to deliver particles into the fluidized bed coater.

U.S. Pat. No. 3,501,097 (hereinafter '097 patent) shows that flowing gas has been used to remove precise amounts of powder from a hopper in a flame spray gun application. Flame spray guns are used to soften fusable material using heat and to project the fusable material onto a surface to which the fusible material is to be applied. The '097 patent shows the use of output conduit backpressure as a feedback mechanism used to regulate the flow of powder in a nozzle. As shown in FIG. 8 of the '097 patent the nozzle 66 is situated beneath the surface of a powder pile 64 and provides constant, but varied flow of gas. The flow of gas moves powder from the powder pile 64 towards the output conduit 60. However, because the '097 patent utilizes varied backpressure as a feedback mechanism, it follows that there will be some pressure variation in the output conduit. This type of system is considered unsuitable for fluidized bed coater applications due to the inherent pressure sensitivity of the pyrolytic carbon coating process.

It is therefore an object of the present invention to provide an improved device for feeding particulate material into a fluidized bed coater that has no mechanical or moving parts that come in contact with the particles being fed.

It is a further object of the present invention to provide a device for feeding particulate material into a fluidized bed coater that allows for the introduction of a constant flow of purge gas into the coater.

It is another object of the present invention to provide a device for feeding particulate material into a fluidized bed coater that includes a feedback apparatus that controls the introduction of predetermined amounts of particulate material into the fluidized coating bed.

These and other objects of the present invention will become evident from a reading of the following description in conjunction with the accompanying drawings.

SUMMARY OF THE INVENTION

The present invention addresses the needs identified above as well as other needs by providing a particle feeding device and method for fluidized bed coaters that has no moving parts and which preferably allows for a constant flow of purge gas into the fluidized bed coater. Moreover, it also preferably has a feedback control means for monitoring and precisely controlling the flow of particles into the coater.

BRIEF DESCRIPTION OF THE DRAWINGS

FIG. 1 shows a typical embodiment of a fluidized bed coater representative of one in combination with which a particle feeding device is employed;

FIG. 2 is a schematic view of a particle feeder useful as a part of a system embodying particular features of the invention in combination with a fluidized bed coater as schematically depicted in FIG. 1;

DETAILED DESCRIPTION OF THE INVENTION

Figure 3:
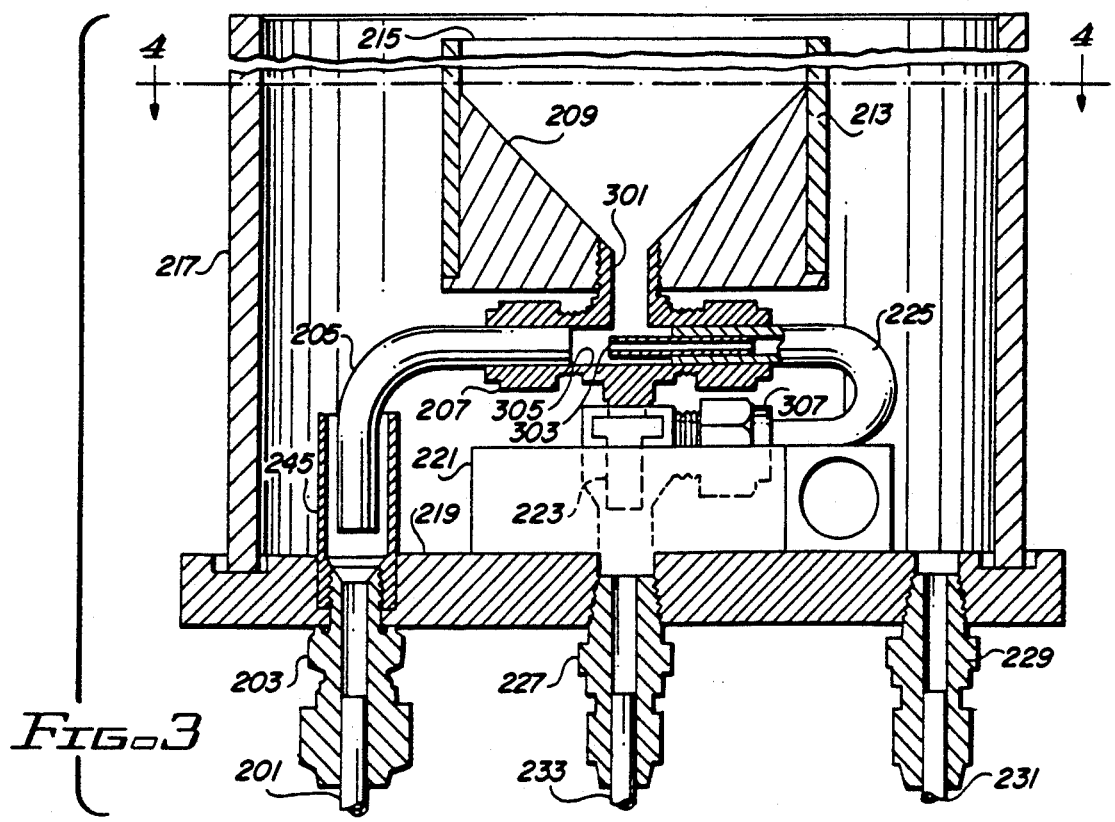
FIG. 3 is a cross sectional view showing a preferred embodiment of the feeding device depicted in FIG. 2.

The following description of the presently contemplated best mode of practicing the invention is not to be taken in a limiting sense, but is made primarily for the purpose of describing the general principles of the invention. The scope of the invention is defined by the appended claims.

A preferred particle feeder uses a pulsed gas jet to direct a stream of gas through a nozzle to blow particles from a pile of particles into the fluidized bed coater without the use of moving parts that can easily wear or bind. The particles are fed by gravity onto the pile from a hopper which pile forms in a generally horizontal connector located below an outlet from the hopper. As the pile builds up it closes off the hopper outlet thereby temporarily stopping the flow of particles into the connector. The nozzle is preferably located coaxially within the generally horizontal connector and is positioned such that it is within the pile of particles. When the nozzle is activated, particles are blown from the pile and down the length of the connector. Thereafter the particles travel into the fluidized bed coater assisted by gravity.

Operation of the gas jet is achieved through the use of a three way solenoid valve. The input to the valve is supplied with a constant stream of inert gas. This gas stream is normally directed by the valve through a main inlet into a gas-tight enclosure which houses the hopper assembly. When the solenoid is activated by a feedback control means, the input gas is redirected through a central inlet leading into the nozzle. In this way a constant flow of inert gas is delivered into the fluidized bed coater independent of the position of the solenoid valve.

As particles exit the hopper assembly, the decreased weight of the hopper is detected by a load cell. The load cell communicates this weight loss to the feedback control means wherein a determination is made as to whether the proper amount of particulate, or granular, material left the hopper during the current pulse of gas. If the determination is made that too few particles have exited the hopper, the duration of the gas pulse is lengthened for the subsequent cycle. Likewise, if the determination is that too many particles have exited the hopper, the duration of the subsequent gas pulse is shortened. In this way, an extremely constant amount of particulate material can be fed into a fluidized bed coater over the course of a coating run or a highly accurate changing input rate of particles can be achieved in response to a desired program.

Referring to FIG. 1, the example fluidized bed coating apparatus 11 includes a furnace having a cylindrical outer shell 13. The furnace shell supports the coating enclosure which is defined by a tube 14 having an insert 15 affixed thereto at its lower end. The insert tube 15 provides the internal coating enclosure with a conical bottom surface 17. A central passageway 19 extends vertically upward through the insert 15 coaxial with the tube 14. The coating and fluidizing atmosphere is supplied upward through this passageway.

The upper end of the tube 14 is provided with a removable closure 21. The removable closure 21 includes a central exit passageway 23 through which the fluidizing and coating gasses leave the furnace enclosure. The particulate material feeding device of the present invention could be mounted above the enclosure as schematically depicted 25. The feeder is designed to feed minute particles into the coating enclosure at a desired rate by blowing them downward through an opening 26 in the closure where they fall the length of the tube 14 until they enter or become part of the fluidized bed.

In the fluidized bed coating apparatus 11, the bed of minute particles is levitated generally near the bottom of the heating enclosure 13 in approximately the location depicted in FIG. 1 by the upward flowing gas stream. The gas stream is usually made up of a mixture of an inert gas and a carbonaceous substance such as a gaseous hydrocarbon. The mixture flows through a common line 39 which connects to the vertical passageway 19 in the insert 15.

The total flow of the gas is regulated so that the fluidized bed occupies the region near the bottom of tube 14. As the coating operation proceeds and the thickness of the deposited layers grows, the total available deposition surface area in the fluidized bed increases. One effect of this increase is an expansion of the fluidized bed upward as for example to the approximate level depicted by the dotted line L.

A withdrawal tube 47 is provided which extends upward from the conical surface 17 of the insert for a predetermined distance such that the upper end of the tube is below the level of the bed. The withdrawal tube 47 connects to an exit passageway 49 which is located adjacent the periphery of the insert 15 and which extends down to an opening at the bottom thereof. A discharge pipe 51 connects the opening at the bottom of the exit passageway 49 to a collection chamber 53 which is suitably sealed from the atmosphere and which contains a particle holding device at the bottom thereof into which particles 57 falling through the withdrawal tube 47 will ultimately be directed. The collection chamber 53 is pressurized with inert gas from a suitable source 59, and the flow of inert gas is controlled by a regulating valve 61.

The flow of inert gas through the collection chamber 53, up the passageway 49 and out the upper end of the withdrawal tube 47 is used to control the rate at which coated particles 57 are withdrawn from the fluidized bed in order to maintain the desired bed size. Initially, sufficient gas flow is maintained upward through the tube 47 to prevent any particles from exiting. By decreasing the flow rate of inert gas through the withdrawal tube 47, the withdrawal of particles will begin. Thereafter, further decrease or increase in the flow rate of gas through the withdrawal tube 47 will, respectively, either increase or slow the rate of withdrawal of particles. Thus, the withdrawal of particles so as to effect a decrease in the total available deposition surface area to at least partially offset the continuing increase of surface area (resulting from the growth in diameter of the particles) can be employed in combination with the particle feeder herein disclosed to maintain the total available deposition surface area within a desired range in order to deposit pyrolytic carbon having uniform physical characteristics.

Replenishment of particles through the particle feeder herein disclosed is usually effected with particles of about the same size as those particles initially making up the bed and, therefore, much smaller than the coated particles being removed.

When particles are used having a density of at least 3g/cm$^3$ (i.e. greater than the density of the carbon coating), they will gradually become less dense as they grow in size. The smaller uncoated particles tend to remain in the lower portion of the bed due to the influence of gravity while the less dense coated particles are levitated to the upper portion of the bed. By using a steady state bed and assuring the programmed withdrawal of coated particles and the simultaneous replenishment of smaller sized particles, it has been found that the thickness of the coating being deposited will be limited only by the size of the furnace enclosure or by the weight of the substrate being levitated, and the pyrolytic carbon deposit will continue to be uniform in its physical properties.

It is noted that like reference numeral have been used to refer to like items throughout the diagrams.

Referring to FIG. 2, a schematic view is shown of the preferred embodiment depicted schematically in FIG. 1 in combination with fluidized bed coater. The preferred embodiment includes the hopper 213 which has a generally cylindrical upper part and a generally conical lower part 209. The upper part has a top end 215 that is preferably open, and the lower part 209 terminates in a "T" shaped connector 207. The connector 207 forms a generally horizontal passageway connected below the lower part 209 of the hopper 213.

Particles 211 flow by gravity from the hopper 213 into the passageway wherein they are selectively blown into an exit conduit 205 as explained more fully below. The exit conduit 205 is coupled through an outlet coupling 245 to an outlet 203 which is connected through passageway, or delivery conduit, 201 to opening 26 loading into the coater (FIG. 1). A hopper assembly is comprised of the hopper 213, the particles or particulate material 211, the connector 207, the exit conduit 205, a flexible input conduit 225, and a bolt or other support means 223 which serves as the only significant support for the hopper assembly. The bolt 223 is connected to a load cell 221, and, being the only support for the hopper assembly, transmits the weight of the hopper assembly directly onto the load cell 221. The load cell 221 communicates the weight of the hopper assembly to a control means 243 via electrical lead 241.

The control means 243 periodically measures and regulates the weight loss of the hopper assembly thereby accurately determining the amount of particles 211 that have left the hopper 213. The control means 243 ensures that the proper amount of particulate material 211 has exited the hopper 213, by controlling a three-way solenoid valve 235 (FIG. 2) via an electrical lead 239. The solenoid valve 235 is configured to receive a constant flow of gas, usually inert gas, through a supply tube 237. Normally, when the solenoid is deactivated, the valve 235 directs all of the gas received into a by-pass inlet 229 via a by-pass tube 231. When the solenoid is activated, the gas entering the valve 235 is directed into the pulse inlet 227 via an inlet tube 233 and an L-shaped coupling 307 (FIG. 4) to the flexible input conduit 225 which in turn is coupled to the connector 207. After a predetermined time delay, measured from the start of the prior gas pulse, the solenoid 235 is activated by the control means 243 thereby directing a pulse of gas through the conduit 233. The flow of gas is thus transmitted to connector 207 and causes the particles that have previously fallen into the connector 207 to be blown out of the connector 207 as described hereinabove.

Referring to FIG. 3, a description of a particle feeding device for a fluidized bed coater will be presented. FIG. 3 shows the feeder in a cross-sectional view which includes the hopper 213 which is comprised of a generally cylindrical upper part and the conical lower part 209. The conical lower part terminates in a lower outlet, or generally vertical passageway 301. The top of the upper part 215 is preferably open while the lower outlet is defined by the interior of the T-shaped connector 207 which also forms the generally horizontal passageway 305. The T-shaped connector is positioned such that the "T" is inverted with the horizontal part of the "T" forming the generally horizontal passageway 305, and the vertical part of the "T" forming the generally vertical passageway, or lower outlet, 301 and extending upward from the generally horizontal passageway 305. The connector 207 and hopper 213 are machined such that they are detachably connected at the lower outlet 301. When the hopper 215 is filled with particulate material (e.g., particles about the consistency of fine "beach" sand having a size between about 200 and about 600 microns), the particulate material flows down into the conical lower part 209 and out the lower outlet 301. The particles flowing out the lower outlet 301 form a pile in the horizontal passageway 305. The flow continues until such time as the pile in the connector unit 307 builds up to the lower outlet 301. At this time the pile will have formed down from the lower outlet to the lower edge of the connector 207 at the natural angle of repose for the particulate material (with respect to the horizontal).

Located within the connector 207, and preferably coaxial therewith, is a nozzle or other gas jet means 303. The position of the nozzle 303 within the connector 207 is such that, when activated, it clears a portion of the connector 207 of particles sideward without blowing particles back into the hopper 213. Hence, an outlet end of the nozzle 303 is located slightly downstream (to the left as oriented in FIG. 3) from the lower outlet 301, but still within the pile as determined by the natural angle of repose for the particulate material. An inlet end of the nozzle 303 is connected to a first end of the flexible gas input conduit 225. The input conduit 225 together with the inlet end of the connector means 207 forms a seal whereby neither gas nor particles may escape the connector means 207 through the inlet end of the connector means 207. The outlet end of the connector means 207 is connected to the exit conduit 205.

In one embodiment, the nozzle 303 has an orifice equal to at least 25% of the interior area of the horizontal passageway 305. In another embodiment, the nozzle 303 has a circular orifice having a diameter equal to at least 20% of the interior diameter of the horizontal passageway 305, and the horizontal passageway 305 has a cross sectional area greater than the cross sectional area of the lower outlet 301 from the hopper 213.

The hopper assembly is comprised of the hopper 213, the connector 207, the nozzle 303, the exit conduit 205, the input conduit 225 and a bolt or other support means 223 which serves as the only significant support for the hopper assembly. The input conduit 225 is sufficiently flexible so as not to significantly support the hopper assembly. The bolt 223 is supported by the load cell 221, and, being substantially the only support for the hopper assembly, transmits substantially the entire weight of the hopper assembly onto the load cell 221. The load cell 221 measures the weight of the hopper assembly and communicates to the control means 243 which controls the solenoid value 235 to be either activated (open) or deactivated (closed). Such control means is more fully described herein below with reference to FIGS. 7 and 8. In the deactivated (closed) position, the inert gas stream enters through by-pass inlet 229. When the solenoid value 235 is in the activated position, the gas flow is directed through the inlet tube 233. The tube 233 supplies gas to the nozzle 303.

The pulse inlet 227 enters the enclosure 217 and is suitably connected to the flexible input conduit 225. The enclosure 217 forms a gas tight chamber which encloses the hopper assembly and the load cell 221. The bypass inlet 229 penetrates the enclosure 217 and, when the solenoid valve 235 is deactivated (closed), continuously supplies gas to the gas-tight chamber. When the solenoid valve 235 is opened by the control means 243, gas enters the pulse inlet 227 and travels through the input conduit 225 to the nozzle 303. When the gas reaches the nozzle 303, it is formed into a gas jet and exits through the exit end of the nozzle 303. Both the gas and the particles travel through the exit conduit 205 to the outlet 203 which interconnects the outlet coupling 245. The exit conduit is generally coaxial with the coupling 245 and allows the particles to drop out of the exit conduit 205 through the outlet coupling 245 and into the gas outlet 203 without contacting the lower wall 219 of the enclosure chamber. Advantageously, this positioning also allows gas entering the enclosure 217 through the by-pass inlet 229 to exit the enclosure 217 through the gas outlet 203. The gas that entered the enclosure 217 via the by-pass inlet 229 travels into the gas outlet 203 from between the inner edge of the outlet coupling 245 and the outer surface of the exit conduit 205. The outlet 203 is connected to an opening 26 in the fluidized bed coater of FIG. 1 via the delivery conduit 201. In this manner, a controlled amount of particulate material can be added to a fluidized bed coater without utilizing moving or mechanical parts while maintaining a constant gas flow into the fluidized bed coater.

Figure 4:
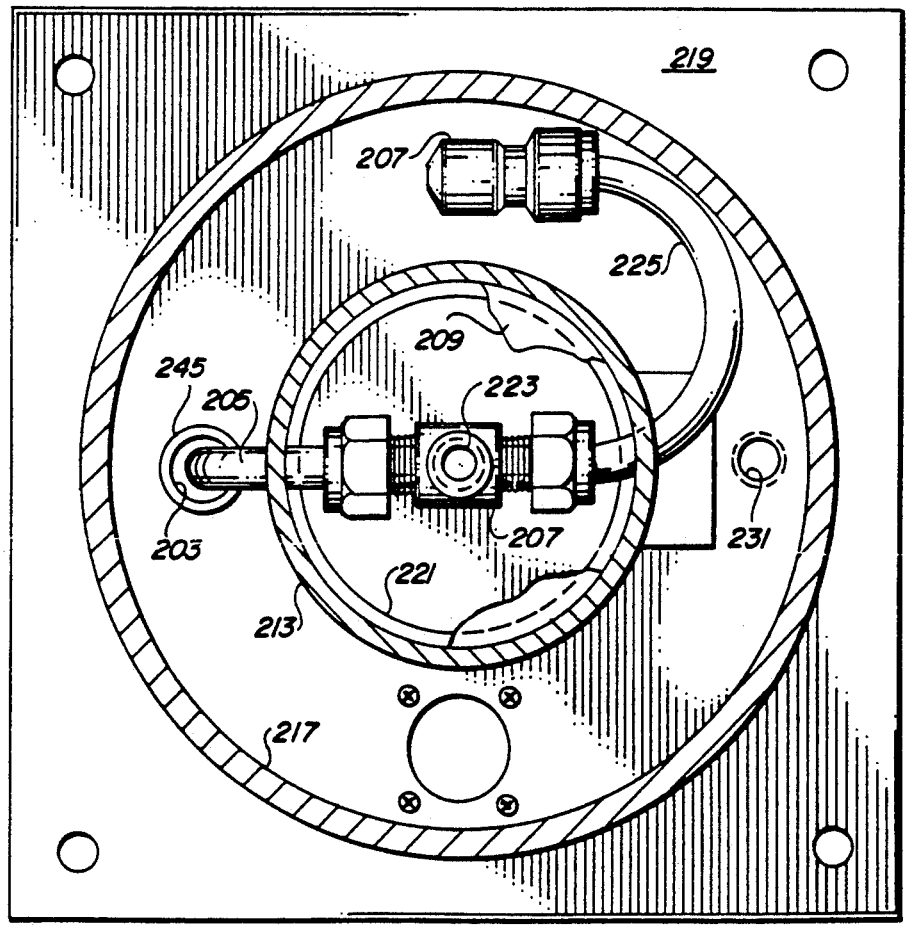
FIG. 4 is a top sectional view of the feeding device taken generally along the line 4—4 of FIG. 3.

In FIG. 4 a diagrammatic view provides a more complete description of the approximate preferred spacial relationships of the indicated components which comprise the particle feeding device of FIG. 3. In particular, the exit conduit 205 is shown coupled coaxially within the outlet coupling 245.

Figure 5:
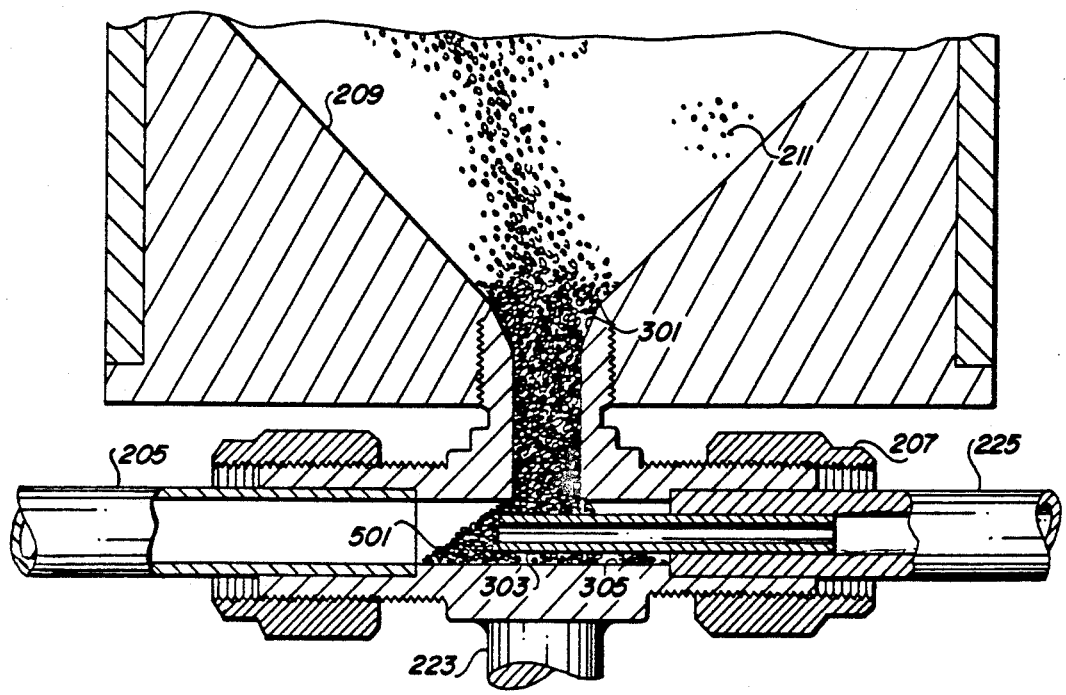
FIG. 5 is a cross sectional view of a connector means and nozzle depicting the position of the particles as they form a pile over the nozzle.

In FIG. 5, a cross-sectional view of the connector 207 and the nozzle 303 is shown depicting the position of the particles as they form a pile 501 over the nozzle. The particles 211 descending through the conical lower part 209 are directed by gravity through the outlet 301 into the generally horizontal passage 305 of the connector 207, wherein they form the pile 501. The particles 211 should be understood to completely fill the conical lower section 209 and continue up into the hopper 213.

As the particles 211 fall by gravity onto the pile 501, the pile 501 builds or piles up to the lower outlet 301 at its natural angle of repose (e.g., between 35 degrees and 39 degrees relative to horizontal for ZrO$_2$ particles of the stated size range). When the pile reaches the top edge of the passageway 305, i.e., where the passageway 305 meets the lower outlet 301, other particles, falling through the lower outlet 301, are prevented, or stopped, from falling into the passage 305 from the lower outlet 301. In this way, particles are stopped from flowing out of the hopper 213 without the use of moving parts. No further particle flow occurs until nozzle 303 directs a gas jet through the pile 501 as described more fully below with reference to FIG. 6. FIG. 5 also shows nozzle 303 positioned generally coaxially within the horizontal passageway 302 of connector 207 such that it is within the pile 501 and "downstream" from, or essentially diametrically therepast, the lower outlet 301 such that, when the gas jet is directed into the pile 501, the particles are blown off the pile toward exit conduit 205, and are not blown upwards through lower outlet 301 toward the hopper 213. Furthermore, it has been found that the movement of particles generally from lower outlet 301 to horizontal passageway 305 and towards exit conduit 205 is best achieved by using a nozzle 303 having an external diameter that allows an annular horizontal passageway that is greater than three diameters of the largest particle to be fed.

Figure 6:
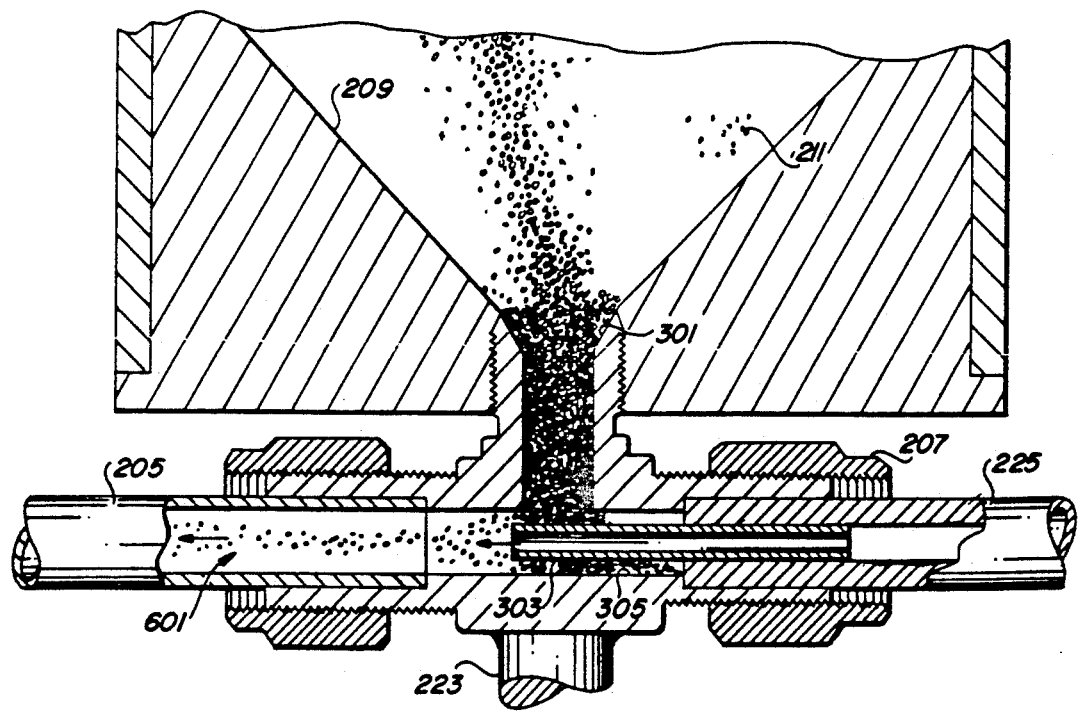
FIG. 6 is a cross sectional view of a connector means and nozzle depicting the movement of the particles into the exit conduit responsive to a gas jet from the nozzle.

Referring to FIG. 6, a cross-sectional view of the connector 205 and the nozzle 303 is shown depicting the position of particles 601 as they are blown from the pile 501 (FIG. 5) by the gas jet from the nozzle 303.

The particles 211, having formed the pile 501 (FIG. 5) over the nozzle 303, stop the flow of particles from the hopper 213 into the horizontal passageway 305 as described more fully above. When the solenoid 235 (FIG. 2) is activated, responsive to the control means 243 (FIG. 2), the gas is directed through the nozzle 303 forming the gas jet, depicted in FIG. 6 by the left pointing arrows. The gas jet blows the particles off the pile 501 (FIG. 5) and toward the exit conduit 205. The gas jet and blown particles 601 are directed out of the connector 207 and through the exit conduit 205. In this way, particles are moved from the horizontal passage 305 of the connector 207 to the exit conduit 205 without the use of moving parts.

Figure 7:
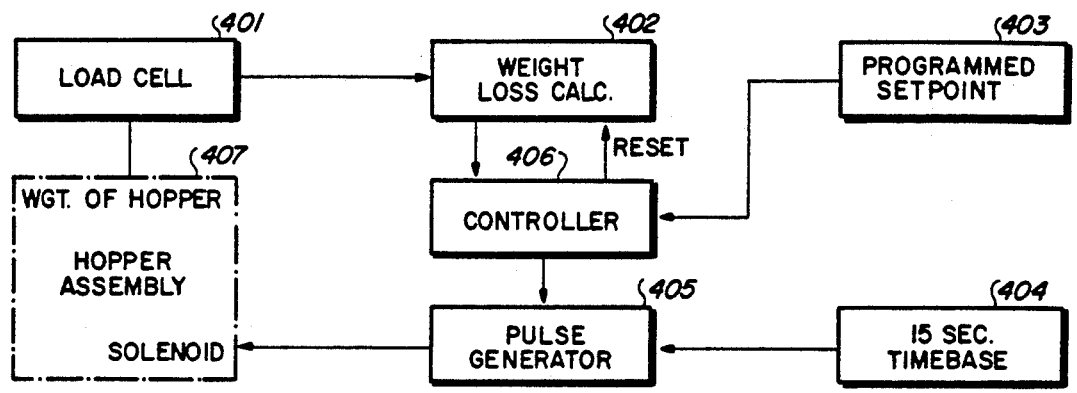
FIG. 7 is a block diagram showing a preferred control means for the feeder in FIG. 2 for controlling the operation of a solenoid responsive to a load cell output.

Referring next to FIG. 7, wherein a block diagram is shown depicting the control means 243 (FIG. 2) in detail for controlling the operation of the solenoid valve 235 (FIG. 2) in response to the load cell 221 (FIG. 2) output. The weight of the hopper assembly 407 is transmitted to the load cell 401 through the bolt 223 (FIG. 2), as described above. Responsive to the weight of the hopper assembly, the load cell generates a "present" voltage output that is proportional to the weight of the hopper assembly and communicates the "present" voltage to a weight loss calculator 402. The weight loss calculator compares the "present" voltage with an "initial" voltage whereby the weight of the particles lost, or fed, from the hopper assembly is determined. The "initial" voltage is set to the "present" voltage in response to a reset signal from a controller 406 before each use of the particle feeding device. The weight of particles lost is communicated to the controller 406. Additionally, a programmed set point 403 that approximates a "ramp" function is communicated to the controller 406. "Ramp" functions are known in the art of electronic control systems design. The controller 406 calculates an error function by comparing the setpoint 403 to the weight of the particles lost from the hopper. In the preferred embodiment, a negative error function indicates that the weight of particles lost is too low and a positive error function indicates that the weight of particles lost is too high. The error function is used to calculate a pulse duration command (PDC). The PDC is continuously calculated by the controller 406 in response to changes in the error function.

Simultaneously, a timebase function is generated by a fifteen-second timebase generator 404. The timebase function approximates a "saw-tooth" wave wherein the period of the wave is approximately fifteen seconds in the preferred embodiment. Other periods can also be used without changing the nature or scope of the present invention. Such "saw-tooth" waves are known in the art of electronic control systems design.

The pulse generator 405 continuously compares the PDC to the timebase function and, in response to the PDC being greater than the timebase function, generates an "ACTIVATE" signal, or in response to the PDC being less then the timebase function generates a "DEACTIVATE" signal. The "ACTIVATE" or "DEACTIVATE" signal is communicated to the solenoid 235 (FIG. 2) and controls the solenoid to be either activated or deactivated respectively. In this way the gas jet is turned on and off in a pulsating fashion responsive to whether a sufficient number of particles 211 have fallen into the fluidized bed coater 11.

Figure 8:
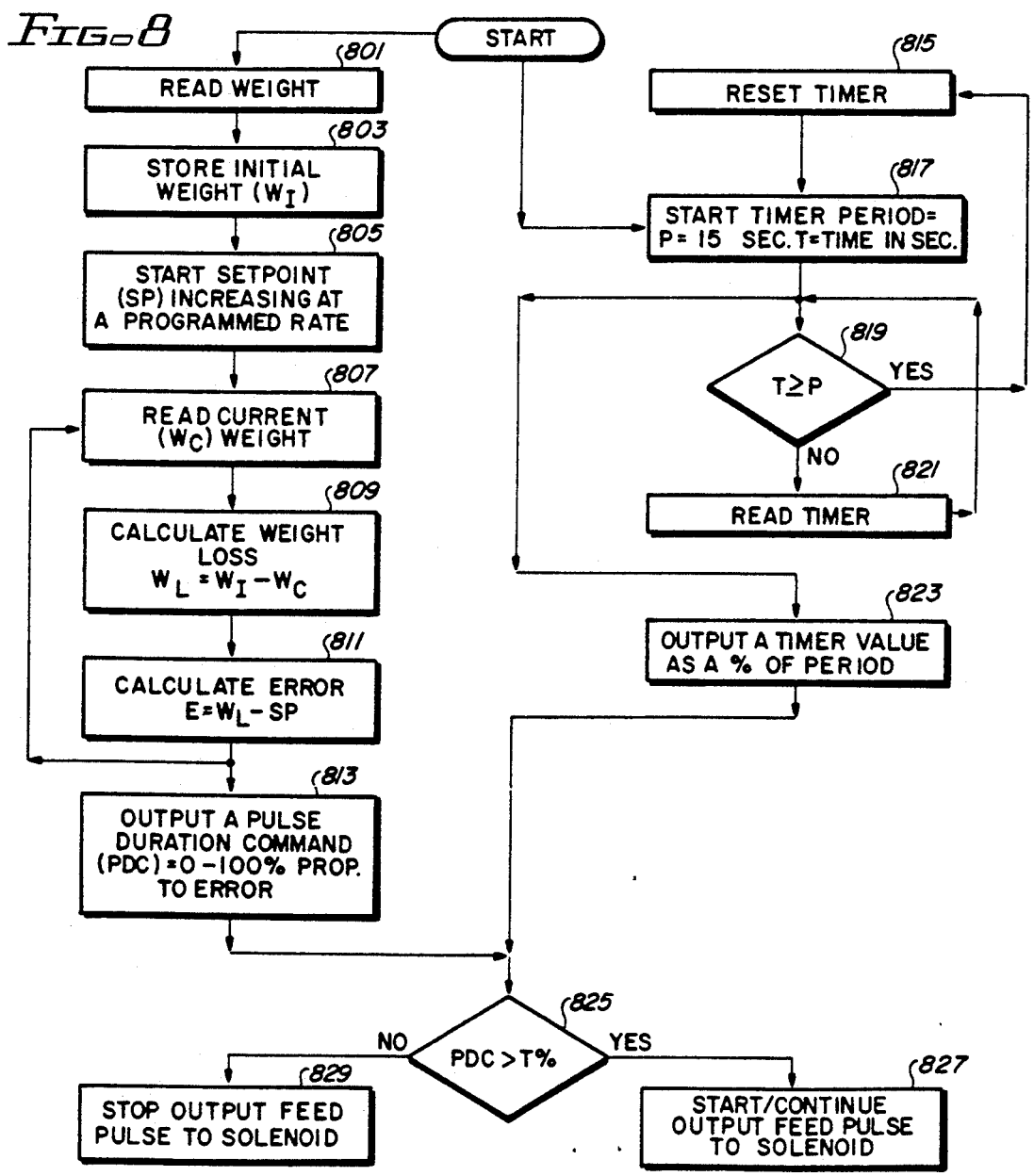
FIG. 8 is a flow chart showing the programmed steps traversed by the control means during operation of the preferred embodiment.

Finally, referring to FIG. 8, wherein a flow chart is shown which illustrates the steps traversed by the control means 243 (FIG. 2) during operation of the preferred embodiment. Before each use of the particle feeding device the "present" weight of the hopper assembly is read 801 and the "initial" weight of the hopper assembly is set to the "present" weight of the hopper assembly 803. At the start of normal operation, the programmed setpoint 403 (FIG. 7), or "ramp" function is started, i.e., it begins increasing approximately linearly from a predetermined minimum voltage. Having completed above-mentioned steps 801, 803 and 805, the particle feeding device is ready to begin normal operation. During normal operation, two processes are simultaneously traversed by the control means 243 (FIG. 2). The first process is a programmed duration command generator (PDCG) comprising steps 807, 809, 811 and 813, and the second is a fifteen-second timebase generator (FSTG) comprising steps 815, 817, 819, 821 and 823.

The pulse duration command generator will be described first. The PDCG process comprises reading the "present" or current weight of the hopper assembly 807, calculating the weight of the particles lost 809, calculating the error function 811, and outputting the pulse duration command. The weight of the particles lost is calculated 809 in the preferred embodiment by subtracting the current weight of the hopper assembly from the "initial" weight of the hopper assembly. The error function is calculated 811 in the preferred embodiment by subtracting the weight of the particles lost from the programmed setpoint. Additionally, after step 811, and contemporaneous with step 813, steps 807 et seq. are repeated.

Simultaneously, the FSTG generates the fifteen-second timebase signal. The FSTG process comprises, resetting a timer 815, starting the timer 817, comparing the elapsed time in seconds with the period of the timer 819, if the elapsed time is less than or equal to the period, reading the timer 821 and repeating step 819, or if the elapsed time is greater than the period, repeating steps 815 et seq. The FSTG process further comprises outputting a fifteen-second timebase, or timer value, proportional to the elapsed time divided by the period 823. The fifteen-second timebase approximates a "sawtooth" wave as mentioned hereinabove.

Finally, the PDC is compared to the fifteen-second timebase 825, and if the PDC is greater than the fifteen-second timebase an "ACTIVATE" signal, or output feed pulse 827, is generated. When the "ACTIVATE" signal is not generated, a "DEACTIVATE" signal 829 is generated. In this way, an output feed pulse is selectively generated in response to the weight of the particles lost from the hopper assembly.

While the invention described herein has been described with reference to a particular embodiment and application thereof, numerous variations and modifications could be made thereto by those skilled in the art without departing from the spirit and scope of the invention as claimed. Accordingly, the scope of the invention should be determined with reference to the claims set forth below.

What is claimed is:

1. A system for feeding precise amounts of granular material to a desired location, which system comprises hopper means for holding a supplying of granular material, said hopper means having a lower outlet, a connector unit attached to said hopper means in the region of said lower outlet which includes means providing a generally horizontal passageway communicating with said outlet, said connector unit including delivery conduit means for receiving granular material for feeding to said desired location, gas jet means extending into said passageway to a location below said outlet and oriented to deliver a gas stream past said outlet and toward said delivery conduit means, means for determining the weight of at least said supply of granular material, means for discharging pulses of gas under pressure through said gas jet means so as to blow granular material from the region below said outlet, which material falls thereunto via gravity, into said delivery conduit means, and control means for actuating said pulse-discharging means in response to said weight-determining means, said control means actuating or not actuating said pulse discharging means, so to as to discharge pulses of gas under pressure, in response to per-unit-time changes in the weight of at least said supply of granular material, said control means thereby causing precise amounts of granular material to be fed to said delivery conduit per unit time.

2. A system in accordance with claim 1 wherein said weight-determining means includes load cell means for sensing the weight of at least said hopper means and the granular material contained therein.

3. A system in accordance with claim 1 wherein said hopper means has a generally conical lower section which leads to said lower outlet and wherein a generally vertical passageway interconnects the lower end of said conical section and said generally horizontal passageway of said connector unit.

4. A system in accordance with claim 3 wherein said gas jet means is located so as to extend beneath said vertical interconnecting passageway and is located so that it extends essentially diametrically therepast, said gas jet means being further located so that it is beneath a pile of said granular material, said pile being defined by said generally horizontal passageway, said generally vertical passageway and an angle of repose for said granular material.

5. A system in accordance with claim 1 wherein said control means is programmable to cause relatively different precise amounts of granular material, per unit time, to be fed to said delivery conduit means over an extended period of time, said control means actuating or not actuating said pulse discharging means in response a pulse duration command, which is a function of the weight of at least said supply of granular material, and in response to a timebase function, which is a function of time.

6. A system in accordance with claim 1 wherein said hopper means and said connector unit are enclosed within an enclosure which is essentially gas-tight except for the exit therefrom of said delivery conduit means.

7. A system in accordance with claim 6 wherein means is provided for delivering gas to said enclosure to create a substantially constant purge flow of gas out of said enclosure through said delivery conduit means.

8. A system in accordance with claim 7 wherein said gas delivery means includes a single gas inlet for supply of said gas-jet means and said purge flow and means for diverting gas flow from said purge gas supply to said enclosure to said gas-jet means to create said pulses of gas.

9. A system in accordance with claim 8 wherein said gas-diverting means includes a solenoid valve for diverting the entire incoming flow of purge gas to said gas jet means.

10. A system in accordance with claim 8 wherein said delivery conduit means leads to a fluidized bed coater and said granular material is delivered by gravity from said delivery conduit means to a fluidized bed of granular material that is maintained within said coater.

11. A system in accordance with claim 1 wherein said gas jet means has an orifice equal to at least about 25% of the interior cross-sectional area of said generally horizontal passageway.

12. A system in accordance with claim 1 wherein said generally horizontal passageway is of circular cross-section and said gas jet means has a circular orifice having a diameter at least about 20% of the interior diameter of said generally horizontal passageway.

13. A system in accordance with claim 12 wherein the cross-sectional area of said generally horizontal passageway is greater than the cross-sectional area of said outlet from said hopper means.

14. A pyrolytic carbon coater which includes a system for feeding precise amounts of granular materials to a fluidized bed, which system comprises:
  hopper means for holding a supply of granular material which hopper means has a lower outlet;
  a connector unit attached to said hopper means in the region of said lower outlet which unit includes means providing a generally horizontal passageway communicating with said outlet;
  said connector unit also including delivery conduit means for receiving granular material from said horizontal passageway and for delivering granular material to said fluidized bed;
  said delivery conduit means leading to said fluidized bed for gravity delivery of said granular material to said fluidized bed that is maintained within the coater;
  a gas-tight enclosure which encloses said hopper means and said connector unit, and which is essentially gas-tight except for the exit therefrom of said delivery conduit means;
  means for delivering gas to said enclosure at a substantially constant rate so as to create a substantially constant purge flow of gas out of said gas-tight enclosure through said delivery conduit means and into the coater;
  gas jet means extending into said passageway to a location below said outlet and oriented to deliver a gas stream past said outlet and toward said delivery conduit means, said gas jet means being located beneath said outlet, so that it extends essentially diametrically therepast, and also located within a pile of said granular material, said pile being defined by said generally horizontal passageway, and a generally vertical passageway, which interconnects said outlet and said generally horizontal passageway, and an angle of repose for said granular material;
  a load cell for determining the weight of granular material remaining in said hopper means;
  means for discharging pulses of gas under pressure, from said gas delivered to said enclosure at a constant rate, through said gas jet means so as to periodically blow granular material from the region below said outlet, which blown material then falls via gravity to said fluidized bed through said delivery conduit means along with said substantially constant purge flow of gas; and
  control means for actuating said pulse-discharging means in response to said determined weight of granular material, said control means being programmable to activate or not activate said pulse-discharging means in response to said determined weight and in response to a programmed set point, said programmed set point changing as a function of time, so as to cause precise amounts of granular material, per unit time, to be fed to said fluidized bed over an extended period of time.

* * * * *